US012759197B2

(12) United States Patent
Persico

(10) Patent No.: US 12,759,197 B2
(45) Date of Patent: Oct. 13, 2026

(54) ROTATIONAL MOULDING PROCESS AND RELATED MOULD FOR ROTATIONAL MOULDING COMPRISING A VENTING DEVICE

(71) Applicant: PERSICO S.P.A., Nembro (IT)

(72) Inventor: Alessandra Persico, Nembro (IT)

(73) Assignee: PERSICO S.P.A., Nembro (IT)

( * ) Notice: Subject to any disclaimer, the term of this patent is extended or adjusted under 35 U.S.C. 154(b) by 203 days.

(21) Appl. No.: 18/565,590

(22) PCT Filed: May 16, 2022

(86) PCT No.: PCT/IT2022/050128
§ 371 (c)(1),
(2) Date: Nov. 30, 2023

(87) PCT Pub. No.: WO2022/254471
PCT Pub. Date: Dec. 8, 2022

(65) Prior Publication Data
US 2024/0253277 A1 Aug. 1, 2024

(30) Foreign Application Priority Data
Jun. 4, 2021 (IT) ........................ 102021000014591

(51) Int. Cl.
*B29C 41/06* (2006.01)
*B29C 33/10* (2006.01)
(Continued)

(52) U.S. Cl.
CPC .............. *B29C 41/06* (2013.01); *B29C 33/10* (2013.01); *B29C 41/46* (2013.01); *B29K 2023/12* (2013.01)

(58) Field of Classification Search
None
See application file for complete search history.

(56) References Cited

U.S. PATENT DOCUMENTS 3,561,060 A 2/1971 Stephens
6,367,765 B1 4/2002 Wieder
(Continued)

FOREIGN PATENT DOCUMENTS

EP 1808280 A2 7/2007
EP 2428343 A1 3/2012
(Continued)

OTHER PUBLICATIONS

Otto Schwarz et al, "Kunststoffverarbeitung—Kapitel 13 Rotationsformen" In: "Kunststoffverarbeitung", Jan. 1, 1997 pp. 181-181.

*Primary Examiner* — Farah Taufiq
(74) *Attorney, Agent, or Firm* — FisherBroyles, LLP; Roger L. Browdy; Ronni S. Jillions

(57) ABSTRACT

A rotational moulding process for producing an article using a mould having a main body including an inner cavity, the process including inserting a fluid form polymeric material into the inner cavity, closing the main body and rotating the mould, while keeping the mould in rotation and with a shutter in a closed position, heating the main body until reaching a first temperature, while keeping the mould in rotation, heating the main body until reaching a second temperature higher than the first temperature, cooling the main body and extracting the article. During the heating of the main body until the reaching of the first temperature, the process further comprises subtracting heat from the shutter for maintaining the shutter at a respective temperature lower than the first temperature.

6 Claims, 5 Drawing Sheets

(51) Int. Cl.

| | |
|---|---|
| ***B29C 41/46*** | (2006.01) |
| *B29K 23/00* | (2006.01) |

(56) References Cited

U.S. PATENT DOCUMENTS

| | | | | |
|---|---|---|---|---|
| 7,677,876 | B2 | 3/2010 | Persico | |
| 2005/0167887 | A1 | 8/2005 | Jones | |
| 2006/0022365 | A1* | 2/2006 | Mazabraud | B29C 41/46 264/45.7 |
| 2007/0166424 | A1* | 7/2007 | Persico | B29C 41/04 425/405.1 |
| 2017/0282415 | A1 | 10/2017 | Ismert et al. | |
| 2020/0316886 | A1* | 10/2020 | Chiu | G02B 3/08 |

FOREIGN PATENT DOCUMENTS

| | | | | |
|---|---|---|---|---|
| FR | 2996488 | A1 * | 4/2014 | B29C 33/0077 |
| JP | 2005131831 | A | 5/2005 | |
| WO | 9612601 | A1 | 5/1996 | |
| WO | 2005069937 | A2 | 8/2005 | |

* cited by examiner

ROTATIONAL MOULDING PROCESS AND RELATED MOULD FOR ROTATIONAL MOULDING COMPRISING A VENTING DEVICE

TECHNICAL FIELD OF THE INVENTION

The present invention relates to a rotational moulding process and to a related mould for rotational moulding comprising a venting device.

STATE OF THE ART

Typically, the rotational moulding is a moulding technology used to make typically hollow articles made of (thermoplastic) polymeric material. Some articles typically made using the rotational moulding technology are for example: parts of motor vehicles (e.g., roofs for trucks and tractors, etc.), boats (e.g., kayaks), tanks/cisterns (e.g., for fuels, for water, etc.), bins, vases, furnishing accessories, street furniture, toys, garden furniture, etc.

U.S. Pat. No. 7,677,876B2 and US2017282415A1 disclose rotational moulding processes which use a mould comprising a venting device.

SUMMARY OF THE INVENTION

In the known rotational moulding processes, it is provided a mould having an inner cavity with a conformation surface suitably counter-shaped to the geometry of the article to be made. The mould is then loaded with the raw polymeric material in fluid form (typically powder), closed and put in rotation about two (typically mutually perpendicular) rotation axes. The rotation of the mould allows to distribute (at least) a layer of polymeric material over the entire conformation surface of the cavity of the mould. During the rotation, the mould is heated (for example by an oven in which the mould is inserted, by electric resistances arranged on the outer surface of the mould, by a heat-transfer fluid that flows in special channels made in the walls of the mould, etc.) to allow the sintering of the raw polymeric material, so that it adheres to the inner surface of the cavity of the mould to reproduce its shape. Subsequently, the mould is cooled, opened and the article is extracted.

In the rotational moulding process disclosed in U.S. Pat. No. 7,677,876B2, a venting device is coupled to the mould to regulate the pressure inside the cavity of the mould during the moulding process.

This venting device comprises a hollow main body having a first and a second mouth which face respectively into the cavity of the mould and outside the mould. The venting device comprises also a shutter at the first mouth, said shutter being alternately movable between a close position and an open position to respectively occlude and leave free the first mouth. The venting device comprises also an actuator and a control rod which mechanically connect the actuator and the shutter to move it between the two positions.

Typically, during the heating of the mould, the shutter is in the close position until a predetermined temperature is reached. In this way, it is avoided that the polymeric material, still in the fluid state (i.e., not yet adhered to the conformation surface), escapes from the mould through the venting device (in particular when the latter is on the conformation surface).

Upon reaching of the aforesaid predetermined temperature, the shutter is opened and the heating of the mould is continued to allow the sintering. In this phase, the shutter in the open position allows the gas venting from the cavity and thus avoids the generation of an overpressure inside the cavity, which could for example arise due to the heating of the contained air and/or to the gases produced by the melting of the fluid polymeric material.

During the subsequent cooling of the mould, the shutter is kept in the open position. In this way, the suction of air from the outer environment towards the cavity of the mould is allowed, in order to compensate for the depression that otherwise would be generated in the cavity (which could cause damages to the formed article).

In this situation, the Applicant has realized that the heating of the mould (to favour the melting of the polymeric material) also causes a heating of the venting device, and in particular of the shutter. This heating of the shutter favours the adhesion of the polymeric material on the surface of the shutter facing the cavity of the mould.

Therefore, periodically (in extreme cases at each moulding cycle), the intervention of an operator to manually clean the surface of the shutter is required, in order to avoid an accumulation of polymeric material which could damage the shutter and/or cause a malfunction of the shutter, with risk of introducing defects in the moulded article, since the shutter (at least partially) loses the ability to regulate the pressure inside the cavity of the mould.

Therefore, according to the Applicant, the known rotational moulding processes require long and/or frequent machine downtime and/or a high use of manpower to perform the cleaning, with consequent increase of the industrial production costs.

The Applicant has therefore faced the problem of reducing the times and/or costs of the rotational moulding processes, in particular by making the cleaning operations of the venting device in the rotational moulding cycles less frequent and/or burdensome.

According to the Applicant, the above problem is solved by a rotational moulding process, and a related mould for rotational moulding, according to the attached claims and/or having one or more of the following features.

According to an aspect the invention relates to a rotational moulding process for producing an article. Preferably the process comprises:

- providing a mould comprising:
  - a main body which defines an inner cavity having a conformation surface counter-shaped to said article, and
  - a venting device fixed to said main body and comprising:
    - an inner chamber in air communication with said inner cavity through a first mouth and with an outer environment through at least one second mouth;
    - a shutter movable between an open position, in which let free said first mouth for putting said inner cavity in air communication with the outer environment, and a close position, in which closes said first mouth for preventing said air communication;
    - an actuator for alternately moving said shutter between the open position and the close position.

Preferably the process further comprises:

- inserting a fluid form polymeric material into said inner cavity;
- closing said main body and rotating said mould;

while keeping the mould in rotation and with said shutter in the close position, heating said main body until reaching a first temperature;

while keeping the mould in rotation, heating said main body until reaching a second temperature higher than said first temperature;

cooling said main body and extracting said article.

Preferably, during said heating said main body until reaching the first temperature, the process further comprises subtracting heat from said shutter for maintaining said shutter at a respective temperature lower than said first temperature.

According to an aspect the invention relates to a venting device destined to be fixed to a main body of a mould and comprising:

an inner chamber in air communication with a first mouth and with at least one second mouth;

a shutter movable between an open position, in which let free said first mouth, and a close position, in which closes said first mouth;

an actuator for alternately moving said shutter between the open position and the close position.

According to an aspect the invention relates to a mould for rotational moulding. Preferably the mould comprises:

a main body which defines an inner cavity having a conformation surface counter-shaped to said article; and a venting device fixed to said main body and comprising:

an inner chamber in air communication with said inner cavity through a first mouth and with an outer environment through at least one second mouth;

a shutter movable between an open position, in which let free said first mouth for putting said inner cavity in air communication with the outer environment, and a close position, in which closes said first mouth for preventing said air communication;

an actuator for alternately moving said shutter between the open position and the close position.

"Outer environment" means any environment outside the inner cavity.

According to an aspect the invention relates to a machine for rotational moulding comprising the mould according to the present invention.

The Applicant believes that the feature according to which the shutter of the venting device is kept relatively cold (with respect to the main body and to the conformation surface) during the first heating phase of the main body (i.e., until the first temperature is reached) allows to limit, if not to completely avoid, that the polymeric material adheres to the shutter on the side facing the inner cavity. This is particularly advantageous when the venting device is located at the conformation surface, a situation in which the shutter can come into contact with a large amount of polymeric material.

In this way the accumulation of polymeric material on the shutter is avoided or limited, thus limiting both the required cleaning operations (with consequent advantages in terms of time and/or costs) and the risk of damages to the venting device and/or to the article due to malfunctions of the shutter.

The present invention in one or more of the aforesaid aspects can have one or more of the following preferred features.

Preferably said first temperature is greater than or equal to 90° C., more preferably greater than or equal to 100° C., even more preferably greater than or equal to 110° C., and/or less than or equal to 160° C., more preferably less than or equal to 150° C., even more preferably less than or equal to 140° C. In this way the adhesion of the polymeric material to the conformation surface of the inner cavity is favoured.

Preferably said second temperature is greater than or equal to 150° C., more preferably greater than or equal to 160° C., even more preferably greater than or equal to 170° C., and/or less than or equal to 250° C., more preferably less than or equal to 240° C., even more preferably less than or equal to 230° C. In this way the complete sintering of the polymeric material for obtaining the finished article is favoured.

Preferably a difference between said first temperature and said respective temperature of the shutter is greater than or equal to 10° C., more preferably greater than or equal to 20° C., even more preferably greater than or equal to 30° C. Preferably said respective temperature of the shutter is less than or equal to 100° C., more preferably less than or equal to 90° C., even more preferably less than or equal to 80° C. In this way the adhesion of the polymeric material on the shutter, and/or its melting, during the first heating phase are efficiently limited.

Preferably said subtracting heat from said shutter comprises generating an air flow which from the outer environment reaches said shutter, and then returns to the outer environment. In this way it is possible to simply cool the shutter. Preferably said air flow reaches a surface of said shutter facing away from said inner cavity (i.e., the surface of the shutter that faces the inner chamber of the venting device).

Preferably said inner chamber is in air communication with the outer environment also through a third mouth, more preferably arranged at opposite side of said inner chamber with respect to said shutter. Preferably said air flow goes from said third mouth to said surface of said shutter, then to said inner chamber and finally to said outer environment through said at least one second mouth. In this way, the air flow rapidly reaches, and therefore without being heated up, the surface of the shutter thus efficiently cooling the shutter.

Preferably said venting device comprises a control rod which mechanically connects said shutter to said actuator, said control rod comprising an inner channel which puts in fluid communication said third mouth with said surface of the shutter facing away from said inner cavity and with said inner chamber. In this way the air flow effectively cools the shutter.

Preferably, during said heating said main body until reaching said second temperature, said shutter is in the open position. In this way, through the second mouth (and possibly also the third mouth), the escape of the gases generated in the inner cavity of the mould during the second heating phase is favoured.

Preferably, during said cooling said main body, said shutter is in the open position. In this way, the suction of air from the outer environment is allowed (through the second and, possibly, the third mouth) so as to compensate for the depression that would be generated in the inner cavity of the mould.

Preferably said venting device comprises a respective main body which defines said inner chamber.

Preferably said venting device comprises a cooling conduit which passes (through) said respective main body, said cooling conduit not being in air communication with said inner chamber.

Preferably, during said heating said main body until reaching the second temperature and/or during said cooling said main body, it is provided cooling (e.g., subtracting heat to) said respective main body of the venting device for maintaining said respective main body at a respective temperature lower than said first temperature.

Preferably a difference between said first temperature and said respective temperature of the respective main body of the venting device is greater than or equal to 10° C., more preferably greater than or equal to 20° C., even more preferably greater than or equal to 30° C. Preferably said respective temperature of the respective main body of the venting device is less than or equal to 100° C., more preferably less than or equal to 90° C., even more preferably less than or equal to 80° C. Preferably said cooling said respective main body of the venting device is carried out through a further air flow which from the outer environment passes through said cooling conduit for returning to the outer environment.

In this way it is possible to further limit, if not to avoid, the risk of malfunctions of the venting device and at the same time increase the number of moulding cycles that can be carried out before performing cleaning operations. The Applicant has in fact observed that at the end of the first heating phase some polymeric material may still be present in fluid form (not yet adhered to the conformation surface). Therefore, when the shutter is moved from the close position to the open position at the beginning of the second heating phase, such material could enter the inner chamber of the venting device melting and adhering to the surfaces of the latter, due to the high temperature that the walls of the inner chamber would reach for the escape of hot air coming from the inner cavity. The cooling of the respective main body of the venting device, on the other hand, makes it possible to keep cool the walls of the inner chamber, avoiding the accumulation of polymeric material and limiting possible damages to the venting device. The Applicant has also observed that it is advantageous to cool the main body of the venting device even during the cooling of the main body of the mould, since the escape of hot air coming from the inner cavity of the mould can cause damages to the venting device, and in particular to the control rod.

In one embodiment said mould comprises a further venting device fixed to said main body and comprising:

- a respective inner chamber in air communication with said inner cavity through a respective first mouth and with an outer environment through at least one respective second mouth;
- a respective shutter movable between a respective open position, in which let free said respective first mouth for putting said inner cavity in air communication with the outer environment, and a respective close position, in which closes said respective first mouth for preventing said air communication;
- a respective actuator for alternately moving said respective shutter between the respective open position and the respective close position.

Preferably said further venting device has one or more of the (e.g., structural) features of said venting device.

Preferably, during said heating said main body until reaching said first temperature and said second temperature, it is provided operating said further venting device as said venting device is operated.

Preferably, during said cooling said main body, the process comprises:

- keeping said shutter in the open position and said respective shutter in the respective open position;
- generating a still further air flow which from the outer environment reaches said inner cavity through said venting device, and then returns to the outer environment through said further venting device.

Preferably said still further air flow goes from said third mouth (and/or from said at least one second mouth) to said inner chamber, then to said inner cavity, then to said respective inner chamber and finally to a respective third mouth of the further venting device (and/or to said at least one respective second mouth).

In this way, during the cooling of the main body, one of the two venting devices acts as an entry point inside the cavity of the mould for a relatively cold air flow (e.g., at room temperature), while the other of the two venting devices acts as an outlet for that air flow. The entry of fresh air allows to effectively subtract heat present in the inner cavity of the mould, thus quickly cooling the formed article.

Preferably said further venting device comprises a further main body which defines said respective inner chamber.

Preferably said further venting device comprises a respective cooling conduit that passes (through) said further main body, said respective cooling conduit not being in air communication with said respective inner chamber.

Preferably, during said cooling the main body, it is provided cooling said further main body of the further venting device, more preferably through a respective air flow that from the outer environment passes through said respective cooling conduit for returning to the outer environment.

In fact, in this embodiment, the inner chamber of the venting device which acts as an outlet for the (hot) air flow coming from the inner cavity (i.e., the still further air flow) tends to heat up with the consequent risk of damages and/or malfunctions of this venting device.

Preferably, during said cooling the main body, it is provided interrupting said cooling of said respective main body of the venting device. In fact, the inner chamber of the venting device which acts as an entry point for the air flow coming from the outside is substantially maintained at the temperature of the air flow immitted for speeding up the cooling of the formed article.

DETAILED DESCRIPTION OF SOME EMBODIMENTS OF THE INVENTION

The features and advantages of the present invention will be further clarified by the following detailed description of some embodiments, presented by way of non-limiting example of the present invention, with reference to the attached figures.

In the figures with the reference number 100' it is indicated a machine for rotational moulding comprising a mould 100 for rotational moulding. The machine 100' comprises rotating means of the mould 100, not shown nor described as, for example, of known type.

Figure 1:
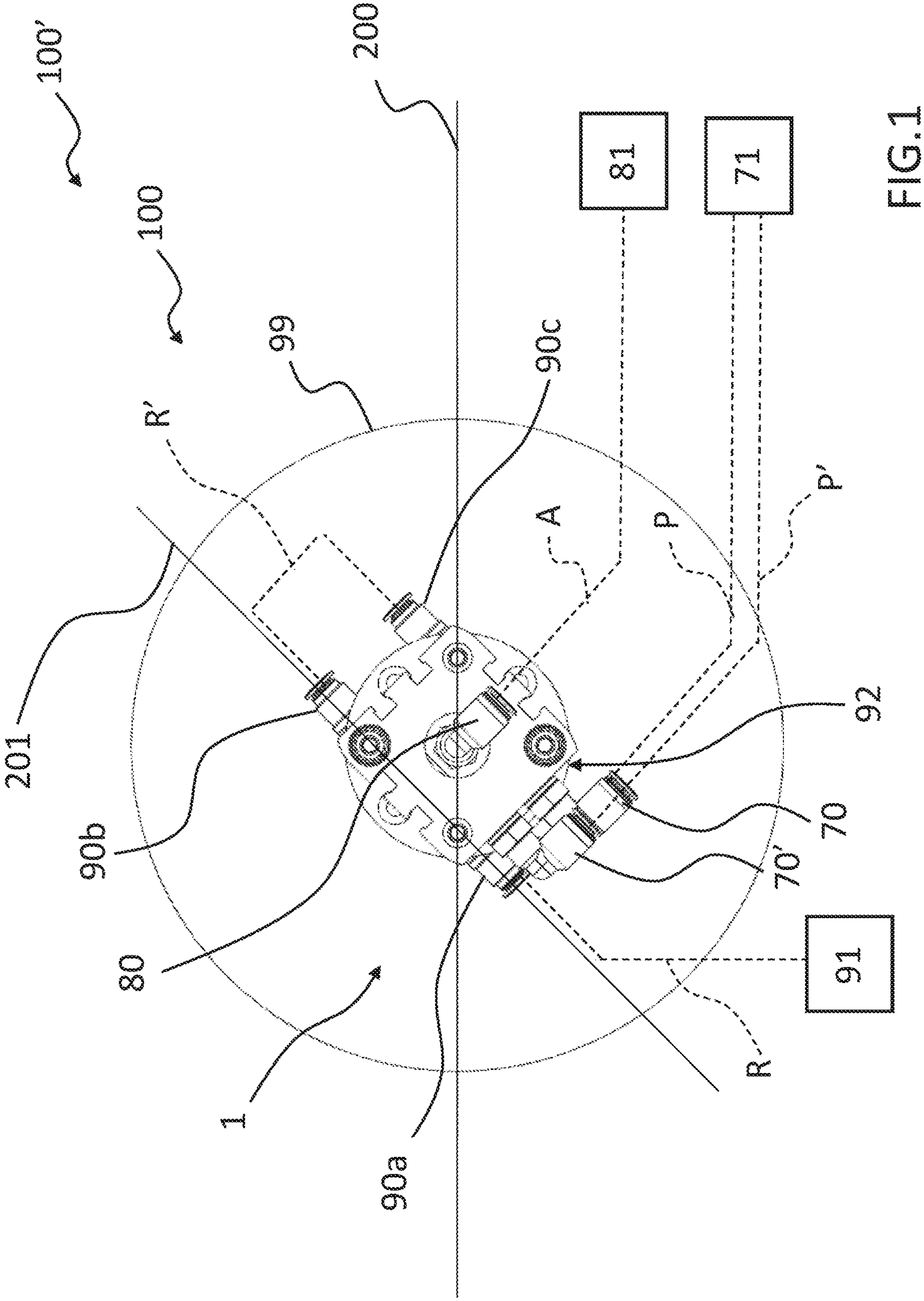
FIG. 1 shows in a purely schematic and partial way a top view of a machine comprising a mould for rotational moulding according to an embodiment of the present invention.
Figure 2:
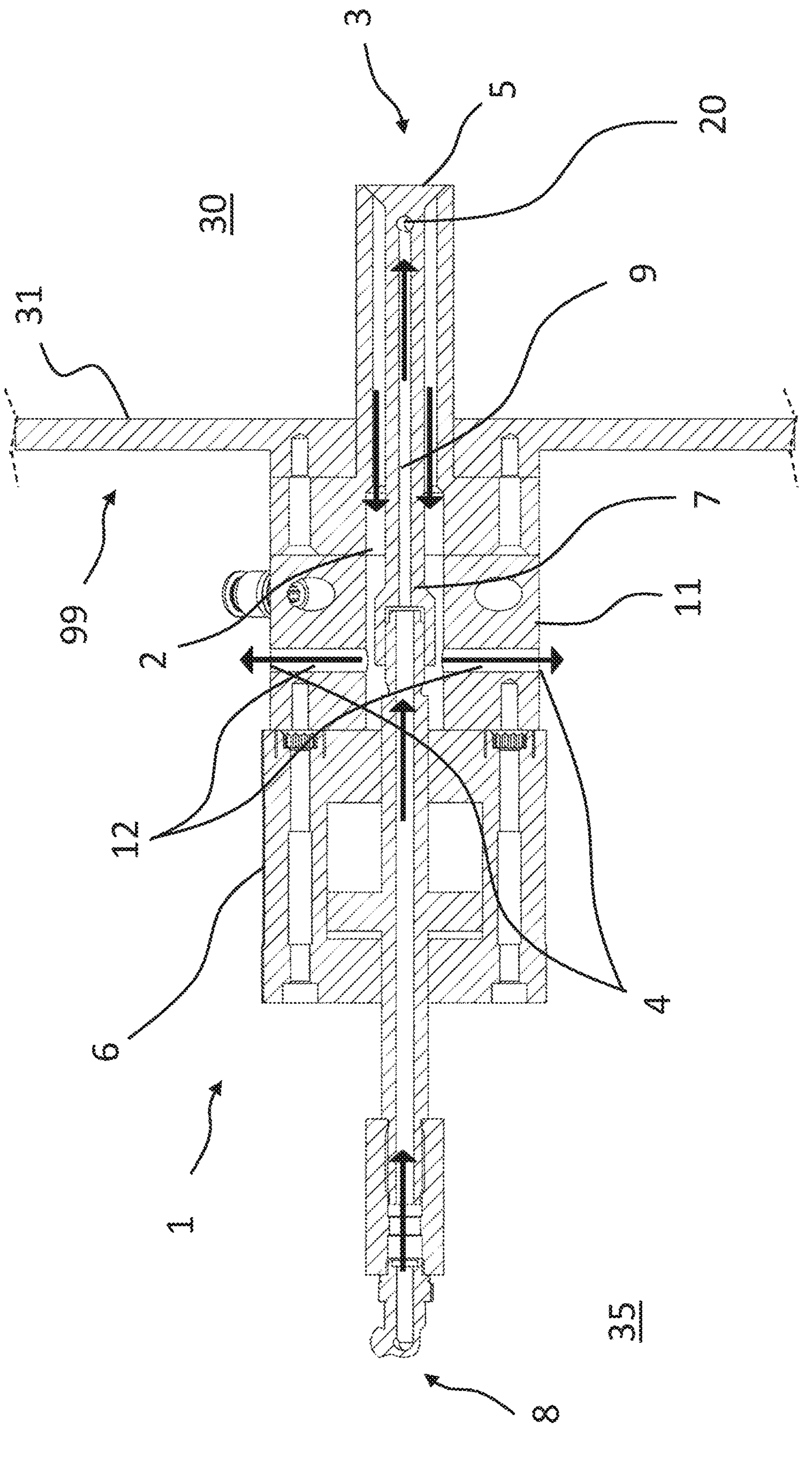
FIGS. 2-3 show a schematic and partial section along the line 200 of the mould of FIG. 1 with the shutter of the venting device respectively in the close and open position.
Figure 3:
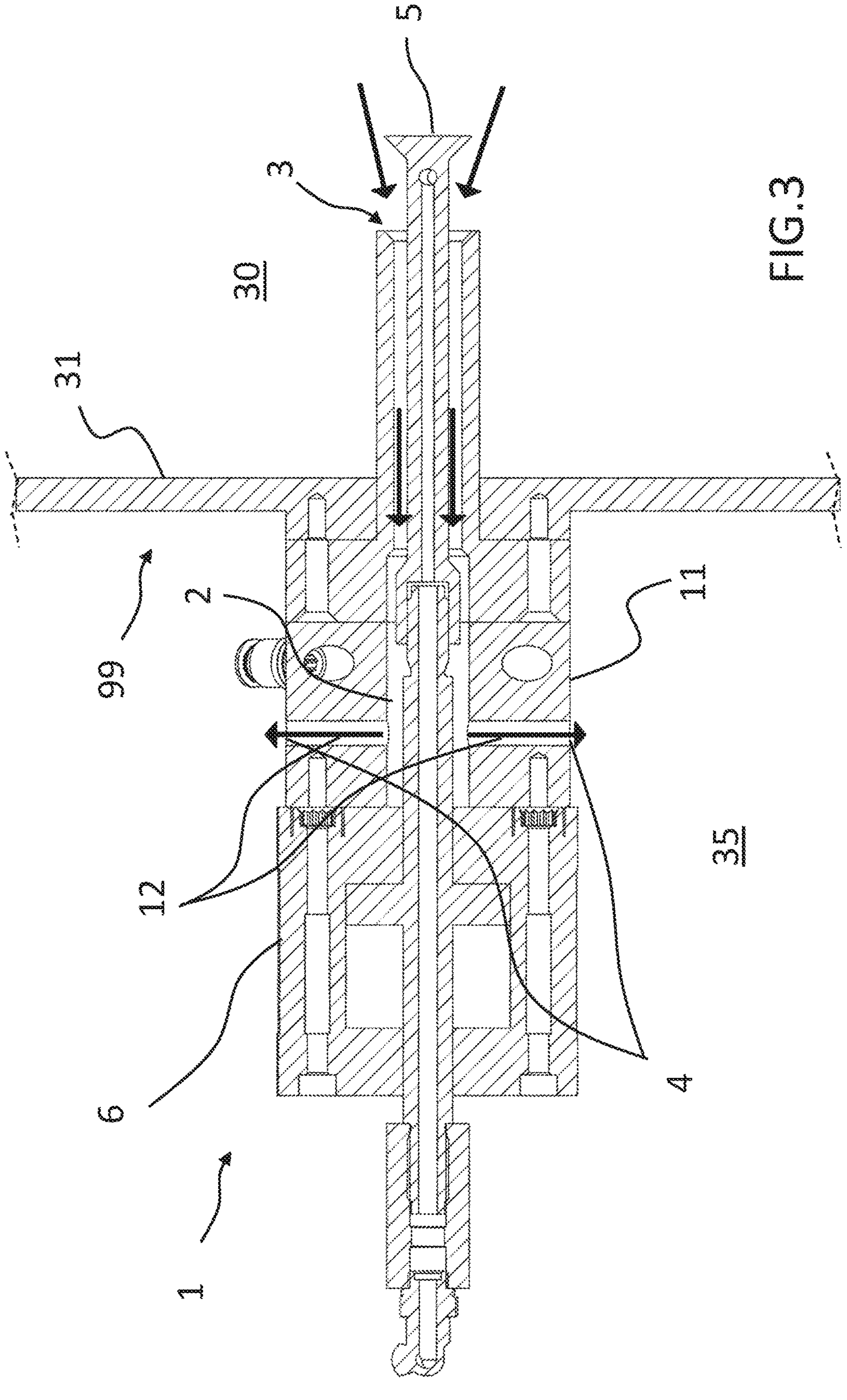
Figure 4:
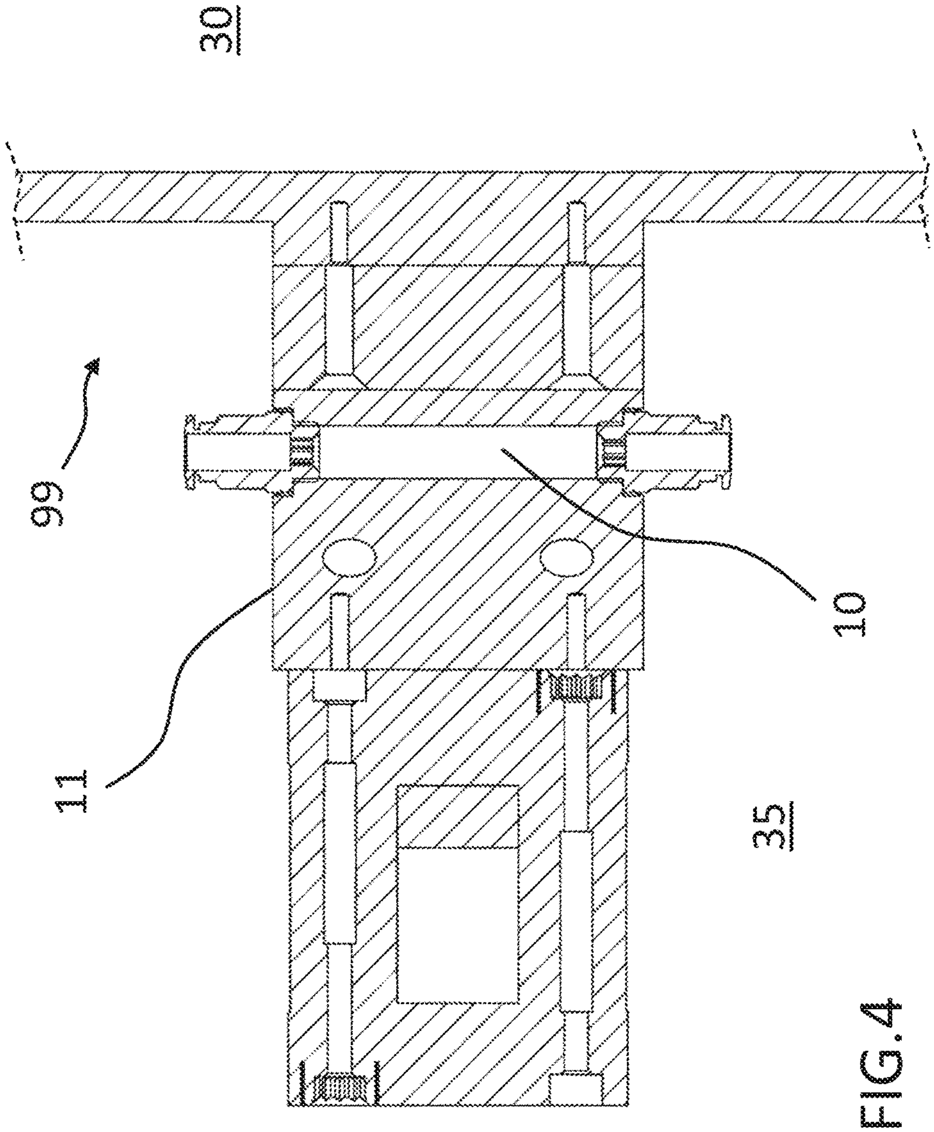
FIG. 4 shows a schematic and partial section along the line 201 of the mould of FIG. 1.

With reference to FIG. 1, a top view of the mould 100 is exemplarily shown in which the section line 200, along which the sections shown in FIGS. 2-3 are obtained, and the section line 201, along which the section shown in FIG. 4 is obtained, are highlighted.

Figure 5:
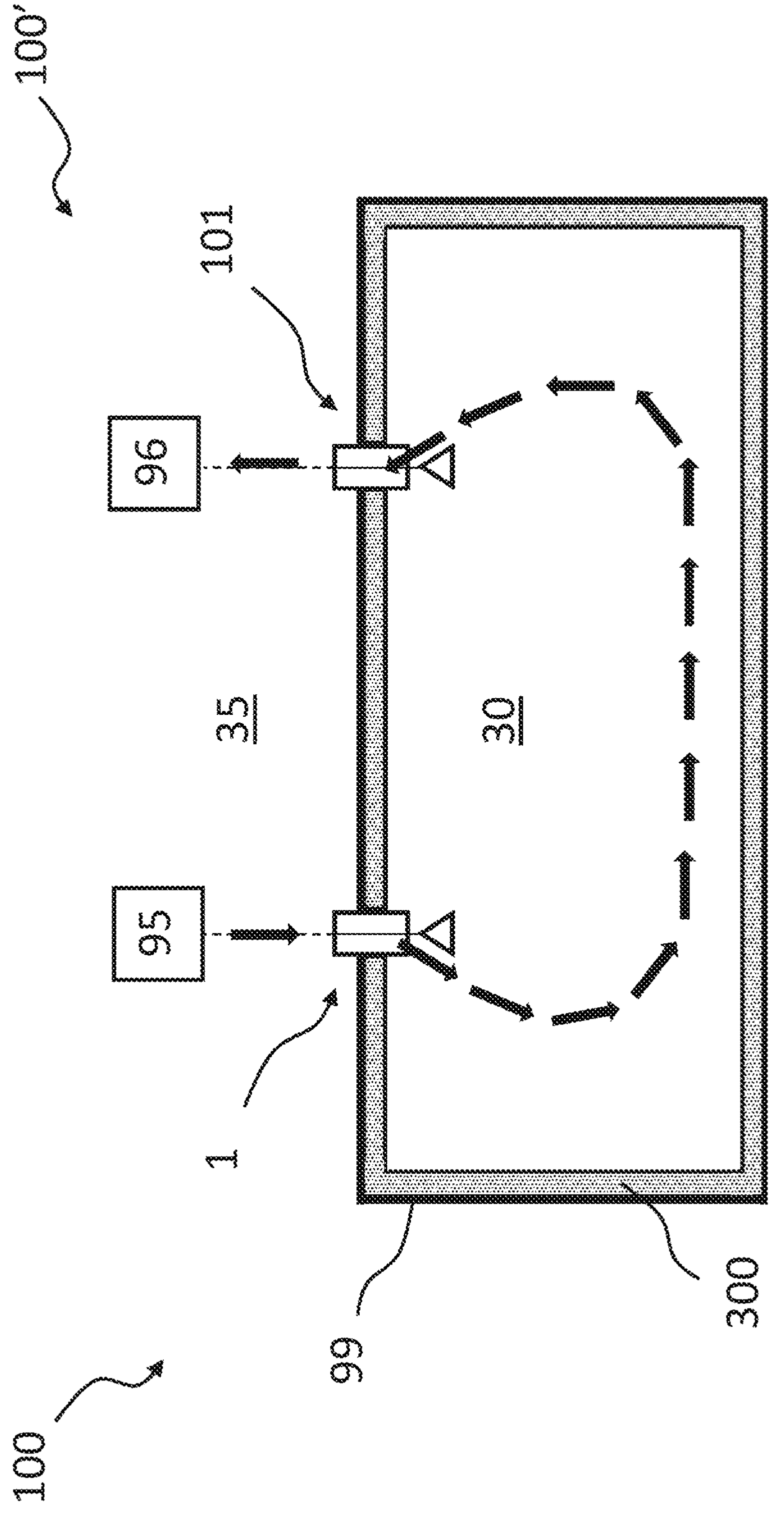
FIG. 5 schematically and partially shows a side section of a machine comprising a mould for rotational moulding according to a further embodiment of the present invention.

The mould 100 comprises a main body 99 (for example a metal shell, e.g., made of aluminum, formed by two half-moulds) which defines an inner cavity 30 having a conformation surface 31 counter-shaped to an article 300 to be produced (schematically shown in FIG. 5). The main body 99 (only partially shown) can have any shape.

The mould 100 comprises at least one venting device 1 fixed to the main body 99, for example by fastening means such as screws or bolts (as schematically shown in FIGS. 2-4).

The venting device 1 comprises an inner chamber 2 in air communication with the inner cavity 30 through a first mouth 3 and with an outer environment 35 through at least one second mouth 4. For example, the venting device can comprise from one to eight second mouths. Exemplarily the venting device 1 shown in the attached figures comprises four second mouths (two of which are visible in FIGS. 2-3) arranged at the end of four conduits 12 arranged in a radial pattern.

The venting device 1 comprises a shutter 5 movable between a close position (schematically shown in FIG. 2) in which it closes the first mouth 3 to prevent an air communication between the inner cavity 30 and the outer environment 35, and an open position (shown schematically in FIG. 3) in which let free the first mouth 3 to allow the aforesaid air communication (e.g., through the air path created by: cavity 30, inner chamber 2, conduits 12 and second mouths 4, as schematically represented by the arrows in FIG. 3).

Exemplarily the shutter 5 has a conical conformation tapered towards the outside of the mould 100. The tapered conical conformation is advantageous for a simple closure of the first mouth 3.

The venting device 1 also comprises an actuator 6 (for example of pneumatic type) for alternately moving the shutter 5 between the open position and the close position. Exemplarily the actuator 6 is a cylinder that comprises a hollow chamber and a piston movable inside the hollow chamber due to the pressure exerted by a fluid (e.g., air, or water or oil) present inside the hollow chamber. The machine 100', as schematically shown in FIG. 1, comprises a control system of the actuator 6 comprising: two fittings 70 and 70' connected to a compressor 71 for example through a respective physical tube, schematically indicated by the lines P and P'. In this way, it is possible to move the piston inside the hollow chamber at both ends of the hollow chamber, so as to alternately move the shutter 5 between the open and close positions.

Alternatively, the actuator 6 can be of the electric type, for example a linear electric actuator.

Exemplarily the inner chamber 2 is in air communication with the outer environment 35 also through a third mouth 8 exemplarily arranged on the opposite side of the inner chamber 2 with respect to the shutter 5. Exemplarily the machine 100' comprises a system for introducing air which comprises (as schematically shown in FIG. 1) a fitting 80 at the third mouth 8 and connected to a pump 81, for example by a physical tube schematically indicated by the line A.

Exemplarily the venting device 1 also comprises a control rod 7 which mechanically connects the shutter 5 to the actuator 6 and which exemplarily comprises an inner channel 9 which puts in fluid communication the third mouth 8 with a surface of the shutter 5 facing towards the inner chamber 2, and (through at least one opening 20) with the inner chamber 2 itself.

Exemplarily the venting device 100 comprises a respective main body 11 which defines the inner chamber 2. Exemplarily the venting device 1 also comprises a cooling conduit which passes through the respective main body 11. This cooling conduit 10 is not in air communication with the inner chamber 2.

The machine 100' exemplarily comprises an air-cooling system which exemplarily comprises (as schematically shown in FIG. 1) three fittings **90*a*, 90*b* and 90*c* and an outlet mouth 92. The fitting 90*a* is connected to a pump 91 through for example a physical tube, schematically indicated by the line R, and it is connected to the fitting 90*b* by the cooling conduit 10. The fitting 90*b* is in turn connected (for example by a U-shaped tube, schematically indicated by the line R') to the fitting 90*c* which is in turn connected to the outlet mouth 92, for example by a conduit (not shown) equal to the cooling conduit 10**.

In the following, it is disclosed an example of a rotational moulding process implementable with the above-described mould 100.

Firstly, the process comprises the insertion of a polymeric material, for example polyethylene (alternatively or in addition, one or more of: polypropylene, polyamide and polycarbonate can be used), in fluid form (for example in powder form) in the inner cavity 30. Subsequently, the main body 99 is closed (e.g., the two half-moulds are fixed by suitable fastening means) and the mould 100 is rotated, for example about two (or three) rotation axes perpendicular to each other.

At this point, with the mould 100 in rotation, the main body 99 is heated up for example by an oven, or by electrical resistances arranged on the outer surface of the main body 99, or by a heat-transfer fluid which flows in suitable channels (not shown) made in the walls of the main body 99.

The heating of the main body 99 can be ideally divided into two subsequent phases, identifiable for the reaching of a determined condition, typically a predetermined temperature value. In these two subsequent phases, the shutter 5 of the venting device 1 is in the two positions shown with reference to FIGS. 2-3 and as described below.

In the first heating phase, the main body 99 is heated until the reaching of a first temperature, exemplarily equal to 120° C. In this first heating phase, the shutter 5 is kept in the close position (shown in FIG. 2) in which it obstructs the first mouth 3, and it is provided to subtract heat from the shutter 5 to keep it at a respective temperature, which can have a drift but remains lower than the first temperature. For example, the respective temperature of the shutter 5 oscillates between 40° C. and 50° C. during the first heating phase of the main body 99.

Exemplarily the heat subtraction from the shutter 5 comprises generating an air flow (e.g., generated by the pump 81) which from the outer environment 35 reaches the surface of the shutter 5 facing the inner chamber 2 (i.e., the surface opposite to the inner cavity 30), and then returns to the outer environment 35. Exemplarily the air flow (schematically represented by the arrows in FIG. 2) follows the air path formed by: third mouth 8, inner channel 9, opening 20, inner chamber 2, conduits 12 and second mouths 4.

At the reaching of the first temperature (for example detectable by a suitable thermal probes), the second heating phase of the main body 99 starts until the reaching of a second temperature, exemplarily equal to 190° C. During this second phase, the aforesaid air flow is interrupted and the shutter 5 is moved to the open position (shown in FIG.

3) in which allows the air communication between the inner cavity 30 and the inner chamber 2 (as schematically shown by the arrows in FIG. 3).

Exemplarily, during the second heating phase of the main body 99, the respective main body 11 of the venting device 1 is cooled to be kept at a respective temperature lower than the first temperature (for example a temperature of about 60-70° C.). The respective main body 11 is exemplarily cooled by a further air flow (generated by the pump 91 shown in FIG. 1) which from the outer environment 35 (e.g., through the fitting 90*a*) passes through the cooling conduit 10 to return to the outer environment (e.g., through the air line formed by the fittings 90*b*, 90*c*, outlet mouth 92 and respective connection lines).

At the reaching of the second temperature, the cooling of the main body 99 begins (e.g., by fans external to the mould, not shown) during which the shutter 5 is kept in the open position and preferably the further air flow is kept active to cool the respective main body 11 of the venting device 1. After the cooling is complete, it is possible to extract the formed article 300.

In one embodiment shown with reference to FIG. 5, the mould 100 comprises a further venting device 101 fixed to the main body 99.

Exemplarily the further venting device 101 has all the features described above for the venting device 1, exemplarily the venting devices 1 and 101 are equal.

In this embodiment, the rotational moulding process also comprises to operate also the further venting device 101 in a completely similar way to what is described above for the venting device 1 during the two heating phases of the main body 99.

During the cooling of the main body 99, the shutter of both the venting devices 1 and 101 is kept in the open position, and a still further air flow (schematically shown by the arrows in FIG. 5) is generated (e.g., by a pump 95) which from the outer environment goes in the inner cavity 30 through the venting device 1, and then returns to the outer environment through the further venting device 101. In one embodiment, the pump 96 is able to generate both an overpressure for generating the air flow useful for subtracting heat from the shutter of the venting device 101 during the first heating phase of the main body 99 (see above), and a depression to favour the suction of the air from the inner cavity 30 during the cooling of the main body 99.

Exemplarily the still further air flow follows the following air path: from the pump 95, it reaches (e.g., through a tube) the third mouth of the venting device 1, then, through the inner chamber of the venting device 1, it reaches the inner cavity 30, and finally, through the inner chamber and the third mouth of the venting device 101, it reaches the pump 96 (e.g., through a suitable tube).

Alternatively, the still further air flow can flow outside through the second mouths of the venting device 101, instead of through the third mouth of the venting device 101.

Exemplarily, during the cooling of the main body 99, the air flow used to cool the respective main body of the venting device 1 is interrupted, and only the air flow used to cool the further main body of the venting device 101 is kept active.

The invention claimed is:

1. A rotational moulding process for producing an article, the process comprising:

providing a mould comprising:

a main body which defines an inner cavity having a conformation surface counter-shaped to said article, and a venting device fixed to said main body and comprising:

an inner chamber in air communication with said inner cavity through a first mouth and with an outer environment through at least one second mouth and a third mouth;

a shutter movable between an open position, in which said first mouth is open for putting said inner cavity in air communication with the outer environment, and a closed position, in which said first mouth is closed for preventing said air communication, said third mouth being arranged at an opposite side of said inner chamber with respect to said shutter;

an actuator for alternately moving said shutter between the open position and the closed position, the process further comprising:

inserting a fluid form polymeric material into said inner cavity;

closing said main body and rotating said mould;

while keeping the mould in rotation and with said shutter in the closed position, heating said main body until the main body reaches a first temperature;

while keeping the mould in rotation, heating said main body until the main body reaches a second temperature higher than said first temperature;

cooling said main body and extracting said article, during said heating said main body until the main body reaches the first temperature, subtracting heat from said shutter for maintaining said shutter at a respective temperature lower than said first temperature by generating an air flow that flows from the outer environment through the third mouth, touches a surface of said shutter facing away from said inner cavity and then returns to the outer environment through said at least one second mouth.

2. The process according to claim 1, wherein said venting device comprises:

a respective main body which defines said inner chamber; and a cooling conduit which passes through said respective main body, said cooling conduit not being in air communication with said inner chamber, wherein, during said heating said main body until the main body reaches the second temperature and during said cooling said main body, the process comprises cooling said respective main body of the venting device for maintaining said respective main body at a respective temperature lower than said first temperature through a further air flow that flows from the outer environment passing through said cooling conduit to return to the outer environment.

3. The process according to claim 1, wherein said first temperature is greater than or equal to 90° C., and/or less than or equal to 160° C., wherein said second temperature is greater than or equal to 150° C., and/or less than or equal to 250° C., and wherein a difference between said first temperature and said respective temperature of the shutter is greater than or equal to 10° C.

4. The process according to claim 1, wherein during said heating said main body until the main body reaches said second temperature and during said cooling said main body, said shutter is in the open position.

5. The process according to claim 1, wherein said mould comprises a further venting device fixed to said main body, the further venting device comprising:

further inner chamber in air communication with said inner cavity through a further first mouth and with an outer environment through at least one further second mouth;

a further shutter movable between a respective open position, in which said further first mouth is open for putting said inner cavity in air communication with the outer environment, and a respective closed position, in which said further first mouth is closed for preventing said air communication;

a further actuator for alternately moving said further shutter between the respective open position and the respective closed position;

a further main body which defines said further inner chamber; and a further cooling conduit that passes through said further main body, said further cooling conduit not being in air communication with said further inner chamber, and wherein, during said cooling the main body of the mould, the process comprises:

cooling said further main body of the further venting device through a respective air flow that flows from the outer environment and passes through said further cooling conduit to return to the outer environment.

6. The process according to claim 5, comprising, during said heating said main body of the mould until the main body reaches said first temperature and said second temperature, operating said further venting device as said venting device is operated, and, during said cooling said main body of the mould:

keeping said shutter in the open position and said further shutter in the respective open position;

generating a still further air flow that flows from the outer environment to reach said inner cavity through said venting device, and then returns to the outer environment through said further venting device.

* * * * *